United States Patent
Powers et al.

(10) Patent No.: US 10,247,936 B2
(45) Date of Patent: *Apr. 2, 2019

(54) THERMALLY SWITCHED OPTICAL FILTER INCORPORATING A GUEST-HOST ARCHITECTURE

(71) Applicant: RavenBrick LLC, Denver, CO (US)

(72) Inventors: Richard M. Powers, Lakewood, CO (US); Wil McCarthy, Lakewood, CO (US)

(73) Assignee: RAVENBRICK LLC, Lakewood, CO (US)

(*) Notice: Subject to any disclaimer, the term of this patent is extended or adjusted under 35 U.S.C. 154(b) by 213 days.

This patent is subject to a terminal disclaimer.

(21) Appl. No.: 13/646,907

(22) Filed: Oct. 8, 2012

(65) Prior Publication Data

US 2013/0033738 A1 Feb. 7, 2013

Related U.S. Application Data

(63) Continuation of application No. 12/758,573, filed on Apr. 12, 2010, now Pat. No. 8,284,336.

(Continued)

(51) Int. Cl.
*G02F 1/01* (2006.01)
*G02B 26/00* (2006.01)
(Continued)

(52) U.S. Cl.
CPC ............ *G02B 26/007* (2013.01); *C09K 19/02* (2013.01); *E06B 9/24* (2013.01); *G02B 26/004* (2013.01);
(Continued)

(58) Field of Classification Search
CPC . G02F 1/01; G02F 1/19; G02F 1/0128; G02F 1/23; G02B 26/007
(Continued)

(56) References Cited

U.S. PATENT DOCUMENTS 3,990,784 A 11/1976 Gelbert
4,006,730 A 2/1977 Clapham et al.
(Continued)

FOREIGN PATENT DOCUMENTS

CA 2620005 A1 7/2008
CN 1189224 A 7/1998
(Continued)

OTHER PUBLICATIONS

Author Unknown, "Liquid Crystal Research", http://chirality.swarthmore.edu (Aug. 21, 2009), 8 pages.
(Continued)

*Primary Examiner* — Kaveh C Kianni
(74) *Attorney, Agent, or Firm* — Dorsey & Whitney LLP

(57) ABSTRACT

Thermochromic filters are constructed using absorptive, reflective, or fluorescent dyes, molecules, polymers, particles, rods, or other orientation-dependent colorants that have their orientation, order, or director influenced by carrier materials, which are themselves influenced by temperature. These order-influencing carrier materials include thermotropic liquid crystals, which provide orientation to dyes and polymers in a Guest-Host system in the liquid-crystalline state at lower temperatures, but do not provide such order in the isotropic state at higher temperatures. The varying degree to which the absorptive, reflective, or fluorescent particles interact with light in the two states can be exploited to make many varieties of thermochromic filters. Thermochromic filters can control the flow of light and radiant heat through selective reflection, transmission, absorption, and/or re-emission. The filters have particular application in passive or active light-regulating and temperature-regulating films, materials, and devices, and particularly as construction materials and building and vehicle surfaces.

15 Claims, 4 Drawing Sheets

Related U.S. Application Data

(60) Provisional application No. 61/168,513, filed on Apr. 10, 2009, provisional application No. 61/262,024, filed on Nov. 17, 2009, provisional application No. 61/296,127, filed on Jan. 19, 2010, provisional application No. 61/299,505, filed on Jan. 29, 2010.

(51) Int. Cl.
  *C09K 19/02* (2006.01)
  *E06B 9/24* (2006.01)
  *G02F 1/13* (2006.01)
  *G02F 1/137* (2006.01)

(52) U.S. Cl.
  CPC .......... *G02F 1/132* (2013.01); *C09K 2219/13* (2013.01); *E06B 2009/2464* (2013.01); *G02F 1/0126* (2013.01); *G02F 1/13725* (2013.01)

(58) Field of Classification Search
  USPC ..... 349/20, 19, 56, 104, 112, 113, 115, 116; 359/265, 266, 267, 272, 288
  See application file for complete search history.

(56) References Cited

U.S. PATENT DOCUMENTS

| | | |
|---|---|---|
| 4,155,895 A * | 5/1979 | Rohowetz et al. .............. 524/89 |
| 4,268,126 A | 5/1981 | Mumford |
| 4,456,335 A | 6/1984 | Mumford |
| 4,475,031 A | 10/1984 | Mockovciak, Jr. |
| 4,491,390 A | 1/1985 | Tong-Shen |
| 4,512,638 A | 4/1985 | Sriram et al. |
| 4,579,638 A | 4/1986 | Scherber |
| 4,640,583 A | 2/1987 | Hoshikawa et al. |
| 4,641,922 A | 2/1987 | Jacob |
| 4,688,900 A | 8/1987 | Doane et al. |
| 4,688,901 A | 8/1987 | Albert |
| 4,755,673 A | 7/1988 | Pollack et al. |
| 4,756,758 A * | 7/1988 | Lent et al. ................. 106/31.32 |
| 4,783,150 A | 11/1988 | Tabony |
| 4,789,500 A | 12/1988 | Morimoto et al. |
| 4,804,254 A | 2/1989 | Doll et al. |
| 4,848,875 A | 7/1989 | Baughman et al. |
| 4,859,994 A | 8/1989 | Zola et al. |
| 4,871,220 A | 10/1989 | Kohin |
| 4,877,675 A | 10/1989 | Falicoff et al. |
| 4,893,902 A | 1/1990 | Baughman et al. |
| 4,899,503 A | 2/1990 | Baughman et al. |
| 4,964,251 A | 10/1990 | Baughman et al. |
| 4,969,719 A | 11/1990 | Bradshaw et al. |
| 5,009,044 A | 4/1991 | Baughman et al. |
| 5,013,918 A | 5/1991 | Choi |
| 5,025,602 A | 6/1991 | Baughman et al. |
| 5,111,629 A | 5/1992 | Baughman et al. |
| 5,132,147 A | 7/1992 | Takiguchi et al. |
| 5,142,386 A * | 8/1992 | Ishihara ........................ 349/192 |
| 5,152,111 A | 10/1992 | Baughman et al. |
| 5,193,900 A | 3/1993 | Yano et al. |
| 5,196,705 A | 3/1993 | Ryan |
| 5,197,242 A | 3/1993 | Baughman et al. |
| 5,212,584 A | 5/1993 | Chung |
| 5,227,115 A | 7/1993 | Harnischfeger |
| 5,274,246 A | 12/1993 | Hopkins et al. |
| 5,304,323 A | 4/1994 | Arai et al. |
| 5,308,706 A | 5/1994 | Kawaguchi et al. |
| 5,319,478 A | 6/1994 | Funfschilling et al. |
| 5,347,140 A | 9/1994 | Hirai et al. |
| 5,377,042 A | 12/1994 | Chahroudi |
| 5,384,653 A | 1/1995 | Benson |
| 5,481,400 A | 1/1996 | Borden |
| 5,525,430 A | 6/1996 | Chahroudi |
| 5,530,263 A | 6/1996 | DiVincenzo |
| 5,574,286 A | 11/1996 | Huston et al. |
| 5,585,035 A | 12/1996 | Nerad et al. |
| 5,585,640 A | 12/1996 | Huston et al. |
| 5,757,828 A | 5/1998 | Ouchi |
| 5,763,307 A | 6/1998 | Wang et al. |
| 5,881,200 A | 3/1999 | Burt |
| 5,889,288 A | 3/1999 | Futatsugi |
| 5,897,727 A | 4/1999 | Staral et al. |
| 5,897,957 A | 4/1999 | Goodman |
| 5,937,295 A | 8/1999 | Chen et al. |
| 5,940,150 A | 8/1999 | Faris |
| 5,948,486 A | 9/1999 | Sage et al. |
| 5,968,411 A | 10/1999 | Hall et al. |
| 6,010,641 A | 1/2000 | Sage et al. |
| 6,030,668 A | 2/2000 | Hall et al. |
| 6,040,859 A | 3/2000 | Takahashi |
| 6,055,089 A | 4/2000 | Schulz et al. |
| 6,099,752 A | 8/2000 | Hall et al. |
| 6,099,758 A | 8/2000 | Verrall et al. |
| 6,122,103 A | 9/2000 | Perkins et al. |
| 6,124,918 A | 9/2000 | Park et al. |
| 6,208,463 B1 | 3/2001 | Hansen et al. |
| 6,218,018 B1 | 4/2001 | McKown et al. |
| 6,226,067 B1 | 5/2001 | Nishiguchi et al. |
| 6,240,114 B1 | 5/2001 | Anselm et al. |
| 6,260,414 B1 * | 7/2001 | Brown et al. ................... 73/295 |
| 6,277,451 B1 | 8/2001 | Mehl et al. |
| 6,281,519 B1 | 8/2001 | Sugiyama et al. |
| 6,288,840 B1 | 9/2001 | Perkins et al. |
| 6,294,794 B1 | 9/2001 | Yoshimura et al. |
| 6,304,784 B1 | 10/2001 | Allee et al. |
| 6,312,770 B1 | 11/2001 | Sage et al. |
| 6,320,220 B1 | 11/2001 | Watanabe et al. |
| 6,329,668 B1 | 12/2001 | Razeghi |
| 6,333,516 B1 | 12/2001 | Katoh et al. |
| 6,381,068 B1 | 4/2002 | Harada et al. |
| 6,437,361 B1 | 8/2002 | Matsuda |
| 6,446,402 B1 | 9/2002 | Byker et al. |
| 6,486,997 B1 | 11/2002 | Bruzzone et al. |
| 6,487,112 B1 | 11/2002 | Wasshuber |
| 6,493,482 B1 | 12/2002 | Al-hemyari et al. |
| 6,498,354 B1 | 12/2002 | Jefferson et al. |
| 6,504,588 B1 | 1/2003 | Kaneko |
| 6,512,242 B1 | 1/2003 | Fan et al. |
| 6,559,903 B2 | 5/2003 | Faris et al. |
| 6,583,827 B2 | 6/2003 | Faris et al. |
| 6,600,169 B2 | 7/2003 | Stintz et al. |
| 6,611,640 B2 | 8/2003 | LoCasclo et al. |
| 6,635,898 B2 | 10/2003 | Williams et al. |
| 6,661,022 B2 | 12/2003 | Morie et al. |
| 6,671,008 B1 | 12/2003 | Li et al. |
| 6,710,823 B2 | 3/2004 | Faris et al. |
| 6,718,086 B1 | 4/2004 | Ford et al. |
| 6,730,909 B2 | 5/2004 | Butler |
| 6,753,273 B2 | 6/2004 | Holonyak, Jr. et al. |
| 6,770,916 B2 | 8/2004 | Ohshima |
| 6,777,718 B2 | 8/2004 | Takagi |
| 6,816,525 B2 | 11/2004 | Stintz et al. |
| 6,847,662 B2 | 1/2005 | Bouda et al. |
| 6,859,114 B2 | 2/2005 | Eleftheriades et al. |
| 6,912,018 B2 | 6/2005 | Faris et al. |
| 6,926,952 B1 | 8/2005 | Weber et al. |
| 6,933,812 B2 | 8/2005 | Sarabandi et al. |
| 6,946,697 B2 | 9/2005 | Pietambaram et al. |
| 6,963,435 B2 | 11/2005 | Mallya et al. |
| 6,965,420 B2 | 11/2005 | Li et al. |
| 6,978,070 B1 | 12/2005 | McCarthy et al. |
| 6,985,291 B2 | 1/2006 | Watson et al. |
| 6,992,822 B2 | 1/2006 | Ma et al. |
| 7,026,641 B2 | 4/2006 | Mohseni et al. |
| 7,038,745 B2 | 5/2006 | Weber et al. |
| 7,040,663 B1 * | 5/2006 | Plaschka et al. .............. 283/72 |
| 7,042,615 B2 | 5/2006 | Richardson |
| 7,046,441 B2 | 5/2006 | Huang et al. |
| 7,068,234 B2 | 6/2006 | Sievenpiper |
| 7,099,062 B2 | 8/2006 | Azens et al. |
| 7,113,335 B2 | 9/2006 | Sales |
| 7,133,335 B2 | 11/2006 | Nishimura et al. |
| 7,154,451 B1 | 12/2006 | Sievenpiper |
| 7,161,737 B2 | 1/2007 | Umeya |
| 7,166,797 B1 | 1/2007 | Dziendziel et al. |
| 7,221,827 B2 | 5/2007 | Domash et al. |

(56) References Cited

U.S. PATENT DOCUMENTS

| | | | |
|---|---|---|---|
| 7,245,431 B2 | 7/2007 | Watson et al. | |
| 7,276,432 B2 | 10/2007 | McCarthy et al. | |
| 7,300,167 B2 | 11/2007 | Fernando et al. | |
| 7,306,833 B2 | 12/2007 | Martin et al. | |
| 7,318,651 B2 | 1/2008 | Chua et al. | |
| 7,351,346 B2 | 4/2008 | Little | |
| 7,385,659 B2 | 6/2008 | Kotchick et al. | |
| 7,470,925 B2 | 12/2008 | Tamura et al. | |
| 7,522,124 B2 | 4/2009 | Smith et al. | |
| 7,532,397 B2 | 5/2009 | Tanaka et al. | |
| 7,538,946 B2 | 5/2009 | Smith et al. | |
| 7,561,332 B2 | 7/2009 | Little et al. | |
| 7,601,946 B2 | 10/2009 | Powers et al. | |
| 7,619,816 B2 | 11/2009 | Deng et al. | |
| 7,655,942 B2 | 2/2010 | McCarthy et al. | |
| 7,692,180 B2 | 4/2010 | Snyder et al. | |
| 7,755,829 B2 * | 7/2010 | Powers et al. | 359/288 |
| 7,768,693 B2 * | 8/2010 | McCarthy et al. | 359/326 |
| 7,911,563 B2 | 3/2011 | Hung | |
| 7,936,500 B2 | 5/2011 | Powers et al. | |
| 7,977,621 B2 | 7/2011 | McCarthy et al. | |
| 8,072,672 B2 | 12/2011 | Powers et al. | |
| 8,076,661 B2 | 12/2011 | McCarthy et al. | |
| 8,169,685 B2 | 5/2012 | Powers et al. | |
| 8,271,241 B2 | 9/2012 | Akyurtlu et al. | |
| 8,284,336 B2 * | 10/2012 | Powers et al. | 349/20 |
| 8,593,581 B2 | 11/2013 | McCarthy et al. | |
| 8,634,137 B2 | 1/2014 | Powers et al. | |
| 8,643,795 B2 | 2/2014 | McCarthy et al. | |
| 8,665,414 B2 | 3/2014 | Powers et al. | |
| 8,699,114 B2 | 4/2014 | McCarthy et al. | |
| 8,755,105 B2 | 6/2014 | Powers et al. | |
| 8,760,750 B2 | 6/2014 | Powers et al. | |
| 2002/0079485 A1 | 6/2002 | Stintz et al. | |
| 2002/0080842 A1 | 6/2002 | An et al. | |
| 2002/0085151 A1 | 7/2002 | Faris et al. | |
| 2002/0114367 A1 | 8/2002 | Stintz et al. | |
| 2002/0118328 A1 | 8/2002 | Faris et al. | |
| 2002/0141029 A1 | 10/2002 | Carlson et al. | |
| 2002/0152191 A1 | 10/2002 | Hollenberg et al. | |
| 2002/0180916 A1 | 12/2002 | Schadt et al. | |
| 2002/0190249 A1 | 12/2002 | Williams et al. | |
| 2003/0035885 A1 | 2/2003 | Zang et al. | |
| 2003/0052317 A1 | 3/2003 | Ohshima | |
| 2003/0059998 A1 | 3/2003 | Holonyak, Jr. et al. | |
| 2003/0066998 A1 | 4/2003 | Lee | |
| 2003/0107813 A1 | 6/2003 | Clabburn et al. | |
| 2003/0107927 A1 | 6/2003 | Yerushalmi et al. | |
| 2003/0129247 A1 | 7/2003 | Ju et al. | |
| 2003/0138209 A1 | 7/2003 | Chan | |
| 2003/0214632 A1 | 11/2003 | Ma et al. | |
| 2003/0218712 A1 | 11/2003 | Kumar et al. | |
| 2003/0227663 A1 | 12/2003 | Agrawal et al. | |
| 2004/0005451 A1 | 1/2004 | Kretman et al. | |
| 2004/0012749 A1 | 1/2004 | Freeman | |
| 2004/0027530 A1 | 2/2004 | Noiri et al. | |
| 2004/0036993 A1 | 2/2004 | Tin | |
| 2004/0062945 A1 | 4/2004 | Domash et al. | |
| 2004/0113123 A1 | 6/2004 | Iftime et al. | |
| 2004/0115366 A1 | 6/2004 | Iftime et al. | |
| 2004/0135962 A1 | 7/2004 | Kuntz et al. | |
| 2004/0150766 A1 | 8/2004 | Choo et al. | |
| 2004/0256612 A1 | 12/2004 | Mohseni et al. | |
| 2005/0068629 A1 | 3/2005 | Fernando et al. | |
| 2005/0099574 A1 | 5/2005 | Ueyama | |
| 2005/0173716 A1 | 8/2005 | Van Helden et al. | |
| 2005/0185125 A1 | 8/2005 | Miyachi et al. | |
| 2005/0221128 A1 | 10/2005 | Kochergin | |
| 2005/0248715 A1 | 11/2005 | Byun et al. | |
| 2005/0271092 A1 | 12/2005 | Ledentsov et al. | |
| 2006/0147810 A1 | 7/2006 | Koch | |
| 2006/0151775 A1 | 7/2006 | Hollenberg et al. | |
| 2006/0238867 A1 | 10/2006 | Takeda et al. | |
| 2006/0257090 A1 | 11/2006 | Podolskiy et al. | |
| 2006/0262398 A1 | 11/2006 | Sangu et al. | |
| 2006/0268216 A1 | 11/2006 | Song | |
| 2006/0274218 A1 | 12/2006 | Xue | |
| 2006/0280219 A1 | 12/2006 | Shchegrov | |
| 2007/0070276 A1 | 3/2007 | Tan et al. | |
| 2007/0121034 A1 | 5/2007 | Ourderkirk et al. | |
| 2007/0215843 A1 | 9/2007 | Soukoulis et al. | |
| 2007/0279727 A1 | 12/2007 | Ghandi et al. | |
| 2008/0008857 A1 | 1/2008 | Kalkanoglu et al. | |
| 2008/0013174 A1 | 1/2008 | Allen et al. | |
| 2008/0049346 A1 * | 2/2008 | Cusick et al. | 359/891 |
| 2008/0061222 A1 | 3/2008 | Powers et al. | |
| 2008/0117500 A1 | 5/2008 | Narendran et al. | |
| 2008/0138543 A1 * | 6/2008 | Hoshino et al. | 428/29 |
| 2008/0160321 A1 | 7/2008 | Padiyath et al. | |
| 2008/0204383 A1 | 8/2008 | McCarthy et al. | |
| 2008/0210893 A1 | 9/2008 | McCarthy et al. | |
| 2008/0241733 A1 * | 10/2008 | Wright et al. | 430/200 |
| 2008/0246388 A1 | 10/2008 | Cheon et al. | |
| 2008/0259254 A1 | 10/2008 | Kikuchi et al. | |
| 2009/0040132 A1 | 2/2009 | Sridhar et al. | |
| 2009/0059406 A1 | 3/2009 | Powers et al. | |
| 2009/0128893 A1 | 5/2009 | McCarthy et al. | |
| 2009/0128907 A1 | 5/2009 | Takahashi et al. | |
| 2009/0167971 A1 | 7/2009 | Powers et al. | |
| 2009/0219603 A1 | 9/2009 | Xue | |
| 2009/0255576 A1 | 10/2009 | Tischler | |
| 2009/0266394 A1 | 10/2009 | Tsubone | |
| 2009/0268273 A1 | 10/2009 | Powers et al. | |
| 2009/0296190 A1 | 12/2009 | Anderson et al. | |
| 2010/0001008 A1 | 1/2010 | McCarthy et al. | |
| 2010/0015363 A1 | 1/2010 | Chiang et al. | |
| 2010/0027099 A1 | 2/2010 | McCarthy et al. | |
| 2010/0045924 A1 | 2/2010 | Powers et al. | |
| 2010/0051898 A1 | 3/2010 | Kim, II et al. | |
| 2010/0060844 A1 | 3/2010 | Sawatari et al. | |
| 2010/0118380 A1 * | 5/2010 | Xue | 359/289 |
| 2010/0232017 A1 | 9/2010 | McCarthy et al. | |
| 2010/0259698 A1 * | 10/2010 | Powers et al. | 349/20 |
| 2010/0271686 A1 | 10/2010 | Powers et al. | |
| 2010/0288947 A1 | 11/2010 | McCarthy et al. | |
| 2011/0025934 A1 * | 2/2011 | McCarthy et al. | 349/20 |
| 2011/0044061 A1 | 2/2011 | Santoro et al. | |
| 2011/0102878 A1 | 5/2011 | McCarthy et al. | |
| 2011/0205650 A1 | 8/2011 | Powers et al. | |
| 2011/0216254 A1 * | 9/2011 | McCarthy et al. | 349/16 |
| 2011/0234944 A1 * | 9/2011 | Powers et al. | 349/86 |
| 2012/0140311 A1 | 6/2012 | Powers et al. | |
| 2012/0262773 A1 | 10/2012 | Powers | |

FOREIGN PATENT DOCUMENTS

| | | |
|---|---|---|
| CN | 1350648 A | 5/2002 |
| CN | 1494091 A | 5/2004 |
| CN | 1672086 A | 9/2005 |
| EP | 1162496 A1 | 12/2001 |
| GB | 2261989 A | 6/1993 |
| JP | 49-094145 | 6/1974 |
| JP | 58-010717 A | 1/1983 |
| JP | 59-231516 | 12/1984 |
| JP | 61-223719 A | 10/1986 |
| JP | 11-078517 A | 7/1989 |
| JP | 02-089426 | 3/1990 |
| JP | 05-147983 | 6/1993 |
| JP | HEI06-082742 A | 3/1994 |
| JP | 06-158956 | 6/1994 |
| JP | 07-043526 | 2/1995 |
| JP | 08-015663 | 1/1996 |
| JP | 09-124348 | 5/1997 |
| JP | 63-127594 | 8/1998 |
| JP | 10-287449 | 10/1998 |
| JP | 10-311189 | 11/1998 |
| JP | 2002520677 | 7/2002 |
| JP | 2002357815 | 12/2002 |
| JP | 2003-502693 A | 1/2003 |
| JP | 2003248204 | 9/2003 |
| JP | 2004004795 | 1/2004 |
| JP | 2004012818 | 1/2004 |
| JP | 2004291345 | 10/2004 |
| JP | 2005250119 | 9/2005 |

(56) References Cited

FOREIGN PATENT DOCUMENTS

| | | | |
|---|---|---|---|
| JP | 2008530766 | | 8/2006 |
| JP | 2006243485 | | 9/2006 |
| JP | 2006285242 | A | 10/2006 |
| JP | 2007515661 | A | 6/2007 |
| JP | 2007272016 | | 10/2007 |
| JP | 2009-289832 | A | 12/2009 |
| KR | 10-0141983 | | 6/1998 |
| KR | 10-20020044153 | A | 6/2002 |
| KR | 10-20030072578 | | 9/2003 |
| KR | 10-20040048916 | A | 6/2004 |
| KR | 10-20040108816 | | 12/2004 |
| KR | 10-20060000059 | A | 1/2006 |
| KR | 10-20070091314 | A | 9/2007 |
| KR | 10-20100039401 | A | 4/2010 |
| WO | 1994002313 | A1 | 2/1994 |
| WO | 1997001789 | A2 | 1/1997 |
| WO | 2000/077559 | A1 | 12/2000 |
| WO | 2001023173 | A1 | 4/2001 |
| WO | 2002064937 | A1 | 8/2002 |
| WO | 2003029885 | A1 | 4/2003 |
| WO | 2003/044591 | A1 | 5/2003 |
| WO | 2003096105 | A1 | 11/2003 |
| WO | 2005031437 | A1 | 4/2005 |
| WO | 2006023195 | A2 | 3/2006 |
| WO | 2006088369 | A2 | 8/2006 |
| WO | 2008092038 | A1 | 7/2008 |
| WO | 2008106596 | A1 | 9/2008 |
| WO | 2008144217 | A1 | 11/2008 |
| WO | 2009/005133 | A1 | 1/2009 |
| WO | 2009/009770 | A1 | 1/2009 |

OTHER PUBLICATIONS

Barbagallo, "Synthesis of Novel Metamaterials: A new Approach Based on Planar Multilayered Frequency Selective Surfaces", VDM Verlag Dr. Muller Aktiengesellschaft & Co. KG, Dudweiler Landstr. 125 a, 61123 Saarbrucken, Germany, Produced in USA by Lightning Source Inc., La Vergne, Tennessee, USA (2008), 5 pages.
Eleftheriades et al. (Editor), Iyer (Author), "Negative-Refraction Metamaterials", Chapter 1 (Wiley 2005), 4-5, 16-30, 321-330.
Fan, et al., "Thin-film conducting microgrids as transparent heat mirrors", Appl. Phys. Lett. (Apr. 5, 1976), 28(8):440-442.
Fedotov, et al., "Asymmetric propagation of electromagnetic waves through a planar chiral structure", The American Physical Society, PRL 97 (Oct. 20, 2006), 167401-1 to 167401-4.
Ginley, et al., "Transparent conducting oxides", MRS Bulletin (Aug. 2000), 15-18.
Goldhaber-Gordon, et al., "Overview of nanoelectronic devices", Proceedings of the IEEE (Apr. 1997), 85(4):521-533.
Hao, et al., "Manipulating Electromagnetic Wave Polarizations by Anisotropic Metamaterials", Physical Review Letters (2007), 99(063908), 4 pages.
Harrison, "Quantum wells, wires, and dots: theoretical & computational physics of semiconductor nanostructures", 2nd Edition (2005), 3 pages.
Lan, et al., "Survey on roller-type nanimprint lithography (RNIL) process", International conference on smart manufacturing application in KINTEX, Gyeonggi-do, Korea (Apr. 2008), 371-376.
Leatherdale, et al., "Photoconductivity in CdSe quantum dot solids", Physical Review B (Jul. 15, 2000), 62(4):2669-2680.
Manea, et al., "Optical characterization of SnO2 thin films prepared by sol gel method, for 'honeycomb' textured silicon solar cells", International semiconductor conference (Sep. 2006), 1:179-182.
Manea, et al., "SnO2 thin films prepared by sol gel method for 'honeycomb' textured silicon solar cells", Romanian Journal of Information Science and Technology 2007) 10(1):25-33.
Padilla, et al., "Electrically resonant terahertz metamaterials: theoretical and experimental investigations", Physical Review B (2007), 4 pages.

Rogacheva, et al., "Giant gyrotrophy due to electromagnetic-field coupling in a bilayered chiral structure", Physical Review Letters (Oct. 27, 2006) 97(177401), 4 pages.
Sarychev, et al., "Plasmonic Nanowire Metamaterials", Negative Refraction Metamaterials: Fundamental Principles and Applications; Chapter 8 (2005), 313-337.
Siegel, et al., "The MSVD low E 'premium performance' myth", International Glass Review (2002), 1:55-58.
Sung, et al., "Dynamics of photochemical phase transition of guest/host liquid crystals with an Azobenzene derivative as a photoresponsive chromophore", Chemistry of Materials (2002), 14(1):385-391.
West, et al., "Characterization of polymer dispersed liquid-crystal shutters by ultraviolet/visible and Infrared absorption spectroscopy", J. Appl. Phys. 70 (7); 1991 American Institute of Physics, Oct. 1, 1991, 3785-3790.
Yamazaki, et al., "Polarisation-insensitive parametric wavelength conversion without tunable filters for converted light extraction", Electronic Letters (Mar. 16, 2006), 42(6):365-367.
US Notice of Allowance, dated Mar. 20, 2012, 17 pages.
Request for Continued Examination, dated May 25, 2012, 3 pages.
US Notice of Allowance dated Jun. 6, 2012, U.S. Appl. No. 12/758,573, 8 pages.
US Corrected Notice of Allowability and Applicant-Initiated Interview Summary dated Jul. 31, 2012, U.S. Appl. No. 12/758,573, 4 pages.
US Amendment After Allowance dated Aug. 16, 2012, U.S. Appl. No. 12/758,573, 4 pages.
USPTO Response to Rule 312 Communication dated Sep. 6, 2012, U.S. Appl. No. 12/758,573, 2 pages.
Request for Certificate of Correction, dated Jan. 29, 2013, 3 pages.
USPTO Response to Certificate of Correction Request, dated Feb. 6, 2013 1 page.
Communications per Rules 161(2) & 162, dated Nov. 17, 2011, 2 pages.
Response to Rules 161/162 Communications, dated May 16, 2012, 9 pages.
Extended Supplemental European Search Report dated Aug. 16, 2012, for EP Application No. 10762570.9, 7 pages.
EPO Communication per Rules 70(2) & 70a(2), dated Sep. 4, 2012, 1 page.
Response to Supplemental European Search Report, dated Mar. 1, 2013, 10 pages.
PCT International Search Report and Written Opinion dated Oct. 26, 2010, PCT Application No. PCT/US2010/030754, 7 pages.
PCT International Search Report and Written Opinion dated Jun. 1, 2011, PCT Application No. PCT/US2010/052518, 7 pages.
First Office Action, dated Feb. 12, 2013 for CA Application No. 2,760,838, 2 pages.
Response to First Office Action, dated Aug. 12, 2013 for CA Application No. 2,760,838, 34 pages.
Second Office Action, dated Oct. 31, 2013 for CA Application No. 2,760,838, 2 pages.
Response to Second Office Action dated Apr. 29, 2014, for CA Application No. 2,760,838, 6 pages.
First Office Action, dated Apr. 23, 2013, 7 pages.
Patent Examination Report #1, dated Jan. 23, 2013 5 pages.
US Non-Final Office Action dated Sep. 25, 2012, U.S. Appl. No. 12/903,856, 7 pages.
Response to Office Action, dated Mar. 25, 2013, 9 pages.
Notice of Allowance, dated Jun. 12, 2013 8 pages.
Request for Continued Examination, dated Sep. 12, 2013 3 pages.
Notice of Allowance, dated Oct. 2, 2013, 9 pages.
U.S. Appl. No. 12/234,383, filed Sep. 19, 2008, P190978.US.02.
U.S. Appl. No. 12/916,233, filed Oct. 29, 2010, P201341.US.02.
U.S. Appl. No. 13/074,876, filed Mar. 29, 2011, P215701.US.03.
U.S. Appl. No. 13/100,000, filed May 3, 2011, P190973.US.03.
U.S. Appl. No. 14/089,059, filed Nov. 25, 2013, P190976.US.06.
U.S. Appl. No. 14/196,998, filed Mar. 4, 2014, P190983.US.07.
U.S. Appl. No. 14/252,184, filed Apr. 14, 2014, P216580.US.03.
U.S. Appl. No. 14/307,274, filed Jun. 17, 2014, P190977.US.06.
Canadian Notice of Allowance dated Apr. 29, 2014, App. No. CA2760838, 6 pages.

(56) References Cited

OTHER PUBLICATIONS

European Examination Report, dated Oct. 10, 2014, App. No. EP10762570.9, 4 pages.
European Response to Examination Report, dated Feb. 3, 2015, App. No. EP10762570.9, 22 pages.
European Notice of Intention to Grant, dated Jan. 8, 2016, App. No. EP10762570.9, 7 pages.
European EPO Communication Inclusion of Claims, dated Nov. 28, 2016, App. No. 16198892.8.
European Response to EPO Communication Inclusion of Claims as Filed on Jan. 30, 2017, App. No. 16198892.8, 8 pages.
European Extended Search Report dated Jun. 8, 2017, App. No. 16198892.8, 5 pages.
Australian Request for Examination, dated May 29, 2012, App. No. AU2010233076, 19 pages.
Japanese First Office Action, dated Aug. 26, 2014—with English Summary, App. No. JP2012-538827, 7 pages.
Japanese Response to First Office Action, dated Feb. 25, 2015—with English Summary, App. No. JP2012-538827, 20 pages.
Japanese Notice of Allowance, dated Mar. 17, 2015—Japanese Only, App. No. JP2012-538827, 3 pages.
Japanese First Office Action, dated Jan. 19, 2016—with English Summary, App. No. JP2015-36507, 8 pages.
Japanese Response to First Office Action, dated Jul. 13., 2016—with English Summary, App. No. JP2015-36507, 10 pages.
Japanese Notice of Allowance, dated Dec. 13, 2016—Japanese Only, App. No. JP2015-36507, 3 pages.
Korean Request for Examination and Amendment, dated Apr. 10, 2015—with English Summary, App. No. 10-2011-7026704, 25 pages.
Korean Non Final Office Action, dated Jan. 12, 2016—with English Summary, App. No. 10-2011-7026704, 10 pages.
Korean Response to Non Final Office Action, dated Apr. 12, 2016—with English Summary, App. No. 10-2011-7026704, 16 pages.
Korean Second Non Final Office Action, dated Aug. 30, 2016—with English Summary, App. No. 10-2011-7026704, 10 pages.
Korean Response to Second Non Final Office Action, dated Feb. 28, 2017—with English Summary, App. No. 10-2011-7026704, 25 pages.
Korean Notice of Letters Patent, dated Oct. 12, 2017—with English Translation, App. No. 10-2011-7026704, 3 pages.

\* cited by examiner

THERMALLY SWITCHED OPTICAL FILTER INCORPORATING A GUEST-HOST ARCHITECTURE

CROSS REFERENCE TO RELATED APPLICATIONS

This application is a continuation of U.S. patent application Ser. No. 12/758,573 filed 12 Apr. 2010 entitled "Thermally switched optical filter incorporating a guest-host architecture," now U.S. Pat. No. 8,284,336, which claims the benefit of priority pursuant to 35 U.S.C. § 119(e) to the following: U.S. provisional patent application No. 61/168,513 entitled "Large throw thermoreflective and thermoabsorptive filters" filed 10 Apr. 2009; U.S. provisional patent application No. 61/262,024 entitled "Thermally switched optical filter" filed 17 Nov. 2009; U.S. provisional patent application No. 61/296,127 entitled "Thermally switched optical filter incorporating a guest-host architecture" filed 19 Jan. 2010; and U.S. provisional patent application No. 61/299,505 entitled "Thermally switched optical filter incorporating a guest-host architecture" filed 29 Jan. 2010. The disclosures of each of these applications are hereby incorporated herein by reference in their entirety.

In addition, this application is related to U.S. patent application Ser. No. 12/172,156 entitled "Thermally switched reflective optical shutter" filed 11 Jul. 2008, now U.S. Pat. No. 7,755,829; U.S. patent application Ser. No. 12/340,552 entitled "Thermally switched absorptive window shutter" filed 19 Dec. 2008; and U.S. patent application Ser. No. 12/019,602 entitled "Thermally switched optical downconverting filter" filed 24 Jan. 2008, now U.S. Pat. No. 7,768,693; U.S. patent application Ser. No. 12/234,383 entitled "Low emissivity window films and coatings incorporating nanoscale wire grids" filed 19 Sep. 2008; U.S. patent application Ser. No. 12/429,092 entitled "Glare management of reflective and thermo reflective surfaces" filed 23 Apr. 2009, U.S. patent application Ser. No. 12/497,365 entitled "Insulating glass unit as shipping container" filed 2 Jul. 2009; U.S. patent application Ser. No. 12/545,051 entitled "Methods for fabricating thermochromic filters" filed 20 Aug. 2009; and U.S. patent application Ser. No. 12/488,515 entitled "Optical metapolarizer device" filed 19 Jun. 2009; and the disclosures of each are hereby incorporated herein by reference in their entirety.

BACKGROUND

1. Field of Technology

This technology relates to a device for controlling the flow of light and radiant heat through selective absorption or reflection of light. The technology has particular, but not exclusive, application in passive or active light-regulating and temperature-regulating films, materials, and devices, especially as a construction material.

2. Description of the Related Art

Switchable mirrors exist which are based on reversible metal hydride and metal lithide chemistry described, for example, in U.S. Pat. No. 7,042,615 to Richardson. These switchable mirrors, which are chemically related to rechargeable batteries, may rely on the physical migration of ions across a barrier under the influence of an electric field and, therefore, have limited switching speeds and cycle lifetimes. In addition, electrically operated "light valves" that combine liquid crystals with one or more reflective polarizers are described, for example, in U.S. Pat. No. 6,486,997 to Bruzzone et al. In these devices, a liquid crystal typically serves as an electrotropic depolarizer, i.e., a means of variably altering or rotating the polarity of the light that passes through it, under the influence of an electric field. Some of these devices can be thought of as switchable mirrors, although they are rarely described that way, since their primary application is in video displays, video projectors, and advanced optics.

Switchable electric light valves that do not require polarizers, but are diffusive forward scatterers or diffusive reflectors, also exist. This is because liquid crystals themselves may act as reflectors (including but not limited to distributed Bragg reflectors or DBRs with different reflection bands in these applications, with a reflective, diffusive, or forward-scattering mode, and a more transmissive mode. These include the polymer-dispersed liquid crystal (PDLC) display, the cholesteric liquid crystal display (Ch-LCD), the Heilmeier display, and the Guest-Host display. The PDLC is an electrochromic device where the index of refraction of liquid crystal droplets embedded in another material is changed electrically, resulting in more scattering of the light in one mode than another. The Ch-LCD has two stable states, the reflective planar and focal conic texture. The reflective planar structure reflects light if the Bragg reflection condition is met and thus acts as a Bragg reflector for one circular polarization of light, while the reflective focal conic transmits more of the light.

An optical structure called a Guest-Host display commonly utilizes dyes dispersed in a liquid crystal, which absorb more light when in one orientation than in another. The orientation of the dyes is dependent on the orientation of the liquid crystal, which is determined using an electric field created by a voltage, typically applied via transparent conducting layers such as indium tin oxide. Such devices may also utilize one or more polarizers. There are positive and negative dichroic (pleochroic and negative dichroic) dyes, among others, which respectively absorb light along different axes of the molecule.

Polymer-stabilized liquid crystals are created when prepolymers and liquid crystals are mixed and the prepolymer is polymerized, to among other things establish or reinforce the orientation of the liquid crystals. Liquid crystal mixed with prepolymers which are cured in various ways and concentrations has been described in the literature, among other terms, as polymer-stabilized, polymer-networked, polymer-enhanced, and polymer-dispersed, among many other terms. This technology is well described in the prior art as, for example, in U.S. Pat. No. 7,355,668 to Satyendra et al., which discloses polymer-enhanced liquid crystal devices, specifically electrically operated display devices, built with rigid or flexible substrates that include polymer "columns" formed between substrate films through the phase separation of a prepolymer (e.g., Norland NOA77 or 78 optical adhesive) and a liquid crystal (e.g., Merck E7, E48, or E31), under the influence of temperature variations. The prepolymer and liquid crystal are mixed above the clearing point temperature of the LC, and are then cooled below the clearing point in order to separate, polymerize, and solidify the polymer network within the liquid crystal material.

More recently, in U.S. patent application Ser. No. 12/172,156 to Powers et al., thermotropic liquid crystal shutters have been described, wherein a thermotropic liquid crystal is placed between two crossed polarizers, such that in one temperature state the liquid crystal forms a twisted nematic waveblock that rotates the polarity of incoming light, allowing the light transmission, absorption, and reflection properties of a single polarizer, while in another temperature state the liquid crystal is in an isotropic state, such that it does not affect the polarization state of incoming light. The device has the optical properties of two crossed polarizers, allowing much lower transmission and much higher absorption or reflection of incident light. The information included in this Background section of the specification, including any references cited herein and any description or discussion thereof, is included for technical reference purposes only and is not to be regarded as subject matter by which the scope of the invention is to be bound.

SUMMARY

The technology disclosed herein is directed to the temperature-based control over transmissivity, reflectivity, or absorptivity with regard to radiant energy (e.g., visible, UV, and infrared light), including up to the entire range of the solar spectrum, for the purpose of regulating the flow of heat into a structure (e.g., a window, building, or vehicle) based on external weather conditions, internal temperature, or any combination of the two, responding over a range of temperatures that make it useful for these purposes. This technology is a device having temperature-responsive transmission, absorption, or reflection of light energy, effected by temperature-induced changes in, among other things, the structure, phase, or order of a thermotropic carrier material (e.g., a thermotropic liquid crystal), which provides temperature-dependent order (or induces temperature-dependent order) to one or more included components that interact with light (e.g., reflective or absorptive dyes, polymers, or inorganic markers), which, for purposes of this document, shall be referred to as "orientation-dependent colorants" (ODCs). Similar to usage with liquid crystal devices generally, the particular local spatial orientation characteristics of the thermotropic carrier material at a given temperature state shall be known as a "director." It should be understood that a particular thermotropic carrier material (e.g., a thermotropic liquid crystal), when used as a component of an embodiment described herein, may exhibit two or more discrete directors, or an analog range of directors, at different temperature states.

For example, at one temperature the thermotropic carrier material may induce significant order in one or more included ODCs (potentially including absorptive, reflective, or fluorescent molecules, dyes, particles, rods, polymer chains, or any combination thereof) suspended or dissolved within the thermotropic carrier material, while at a second temperature may provide little or no preferred director for these ODCs. If the director associated with the first temperature is chosen such that the included components interact less with light at the first temperature than the second temperature, the optical properties such as transmission, absorption, and fluorescence will be different at the two temperatures. The efficiency of absorption, reflection, or transmission can be varied through the selection of the included ODC materials, as can the frequency-dependent efficiencies. The choice of ODC materials may be used to affect percentages and wavelength ranges of reflection, absorption, and transmission above and below a threshold temperature, or over a selected range of temperatures, that are desirable for aesthetics, energy management, or other reasons.

Additionally, if the included ODC materials are reflective, the device may be diffusively reflective due to the distribution of orientations of the included materials. This technology has particular, but not exclusive, application as a glare reduction method for building surfaces. The efficiency, spatial distribution, bandwidth, and center wavelength of reflection can be varied as the orientation of the ODC changes under the influence of the thermotropic carrier material. Examples of reflective ODC materials include flakes, wires, rods, particles, or filaments. These may be composed of metals; of polymers or inorganic ceramic-type materials that are white or otherwise reflective in color; of polymers or inorganic ceramic-type materials that are transparent but which have refractive indices indexes significantly mismatched to that of the thermotropic carrier material; of polymer chains (e.g., polyacetylene) that have inherent reflectivities due to an electrically conductive nature; or of related materials or any combination thereof.

This technology may also be employed as a part of a device operating similarly in function to a temperature-responsive optical depolarizer, (for example, a thermotropic liquid crystal) operating with one or more polarizing filters to regulate the passage of light energy. The order provided or induced in the included materials can be polarizing (in transmission or reflection) at one temperature, and less polarizing or even non-polarizing in another. The incident energies passing through this device will therefore depend on the reflection and absorption efficiencies of both the ODCs and of the polarizers used. For example, when the ODC is induced at one temperature to be a functionally efficient polarizer, and paired with a second efficient polarizer which transmits light of this same polarization, then half of the incident radiant energy passes through the device. However, if a temperature change reduces the order of the ODC such that the ODC will block transmission of light of both polarizations, then the amount of light transmitted through the device may therefore change as well. Lower efficiency polarizers, or ODCs and polarizers with frequency-dependent efficiencies, may be selected to affect percentages of reflection, absorption, and transmission above and below a threshold temperature or over a selected range of temperatures that are desirable for aesthetics, energy management, or other reasons. This effect can be such that the device is less transmissive in either its hot or cold state, or expanded such that the transmissivity of the device is higher in the transparent state. Angle-dependent optical effects may also exist.

The thermotropic carrier material may also induce different amounts of order in one or more included ODCs (whether absorptive, reflective, or fluorescent molecules, dyes, particles, rods, polymers, or any combination thereof) suspended or dissolved within the carrier material at different temperatures. For example, the thermotropic carrier material, and any associated alignment layers or structures, may be selected such that the amount of order provided may decrease with increasing temperatures. If the director associated with the ODC is chosen such that the included components interact more with light as the temperature increases, the optical properties such as transmission, absorption, and fluorescence will therefore vary as the temperature increases. Alternatively, among other possibilities, the director may be chosen such that the included ODCs interact more with light at lower temperatures than at higher temperatures, or the order provided may increase with increasing temperature. Such devices are described, for example, in "Dichroic Dyes for Liquid Crystal Displays" by Alexander V. Ivashenko and "Liquid Crystals" (Second Edition) by S. Chandrasekhar, incorporated herein by reference. These effects may also be combined with other effects, such as those previously described, where order is present at one temperature and not at a second, or where the order changes precipitously at a given temperature or across a temperature range, or with other effects such as having different orders for a given temperature based on the temperature history (e.g., supercooling and hysteresis effects). The efficiency of absorption, reflection, or transmission response for different directors may be varied through the selection of ODC materials, as can the wavelength-dependent efficiencies. The choice of materials may be used to affect percentages and wavelengths of reflection, absorption, and transmission above and below a threshold temperature, or over a selected range of temperatures, that are desirable for aesthetics, energy management, or other reasons.

This technology may employ both specular and diffusive optical effects as described above, to create windows or window filters that exhibit both transparent and opaque privacy-type modes, and prevent the concentration of reflected solar energy in UV, visible, or IR bands in different ways. This technology may also be used to absorb, reflect or transmit, diffusively or specularly, various polarizations and wavelength ranges of light in different ways at different temperatures, to achieve particular aesthetic, privacy, glare, or solar heat gain properties.

Other features, details, utilities, and advantages of the present invention may be apparent from the following more particular written description of various embodiments of the invention as further illustrated in the accompanying drawings and defined in the appended claims.

DETAILED DESCRIPTION

For the purposes of this specification, the term "thermoreflective" shall refer to any object, device, or material having a reflectivity that varies as a function of temperature. Similarly, "thermoabsorptive" and "thermoflourescent" shall refer to any objects, devices, or materials having an absoptivity or fluorescence, respectively, that varies as a function of temperature. Since light transmission is a function of reflection, absorption, and re-radiation of light, any of these objects, devices, or materials may also be properly described by the more generic term, "thermochromic".

Figure 1:
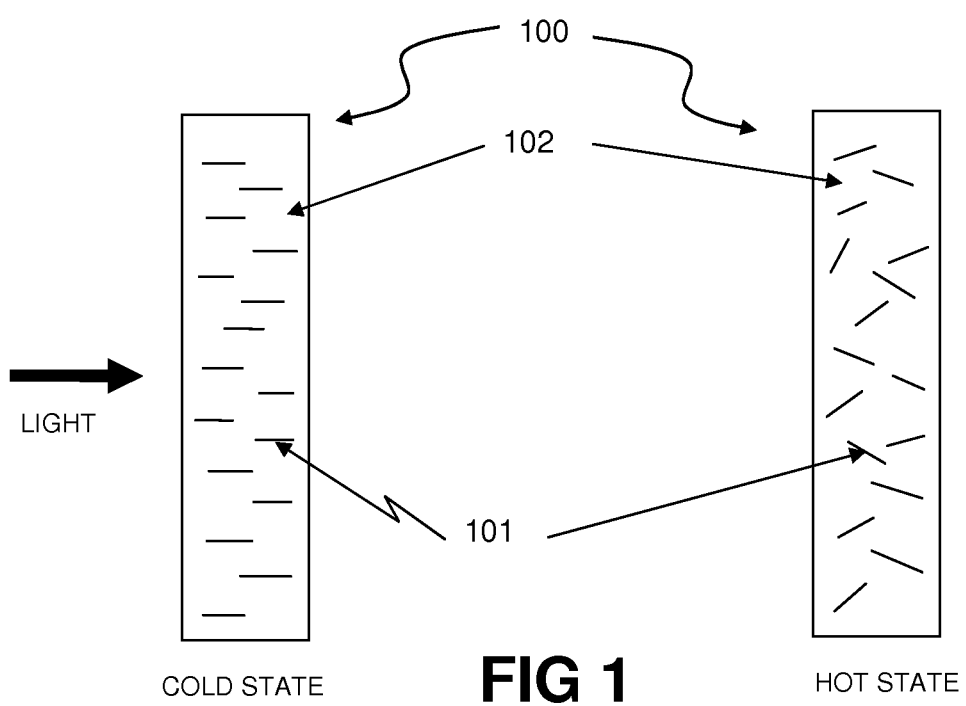
FIG. 1 is a schematic view of an exemplary implementation of a thermochromic filter having ODC materials suspended or dissolved in a thermotropic carrier material (e.g., a thermotropic liquid crystal having molecules aligned perpendicular to the substrate) that provides or induces order for the ODC materials at a lower temperature and does not at a higher temperature.

FIG. 1 is a schematic, cross-section view of an exemplary form of a thermochromic filter device 100. The filter device 100 may be composed of included "orientation dependent colorant" or ODC materials 101 inside a transmissive, thermotropic, order-providing carrier material 102. At a lower temperature, assuming that the ODC molecules interact more strongly with incoming light perpendicular to their long axis, a significant percentage of the incoming light passes through the order-providing carrier material 102 as well as the included ODC materials 101 due to their ordered orientation with respect to the incoming light. As with a shutter or venetian blind in the "open" state, the ODC materials are essentially parallel to the incoming light and thus do not substantially absorb or reflect it. At a higher temperature, more of the incoming light is blocked due to the unordered orientation of the included ODC materials, a large fraction of which are no longer parallel to the incoming light and are therefore capable of absorbing, reflecting, or otherwise interacting with it. It is notable that when the included ODC materials are in the ordered state, the filter device 100 is capable of polarizing light that enters the filter device 100 from directions other than the one indicated in the figure, and thus may be considered a "thermotropic polarizer" for some purposes.

Additional polarizers or other optical elements may also be added to produce different optical effects without affecting the essential nature thermochromic filter device 100.

The thermotropic carrier material 102 may take a variety of different forms for use within the thermochromic filter device 100. Many materials that are transparent to at least some wavelengths of light also experience changes of the amount of order of their molecules (or changes in their director or directors) with changes in temperature. In particular, many thermotropic liquid crystals are optically transparent with high (almost crystalline) order in the liquid crystalline state (i.e., nematic state), while being optically transparent with low order (e.g., a randomly or semi-randomly oriented state) in the isotropic state.

The director of liquid crystal molecules in a liquid crystal state (such as the nematic or smectic states) near a surface can be influenced through the use of alignment layers. Both vertical (homeotropic) and parallel (homogeneous) alignments are common, where the director of the liquid has respectively, a director normal or parallel to the surface. The director can be affected by the surface energy and chemistry of the surface. In general, high surface energy promotes parallel alignment and low surface energy promotes vertical alignment. In the prior art, polydimethylsiloxanes, for example, are commonly used to promote vertical alignment and rubbed polyimides, for example, are used to promote parallel alignments. Methods for promoting various alignments and pre-tilt angles, their intermediaries, hybrids, combinations, and the resulting useful structures when liquid crystal molecules are placed near one, two, or more surfaces are generally known, have been well described in the prior art, and will be familiar to a person of ordinary skill in the art. More complex orientation states also exist and have also been described. For example, in the liquid crystal "blue phase," the director of the liquid crystal molecule rotates in a helical fashion about any axis perpendicular to a line.

If the thermotropic carrier material is a liquid crystal (LC) material, it may be required to meet environmental tolerance specifications that are consistent with the environment in which the device is to be used. For example, in an exemplary thermochromic window application the LC may require a clearing point between 20° C. and 35° C., a freezing point below −40° C., a boiling point above 90° C., and enough UV resistance to survive 30 years of daily exposure to sunlight (possibly attenuated by glass, polarizers, UV-blocking adhesives, and other materials inherent in the thermochromic window structure). Other requirements may also exist, such as a birefringence sufficient to produce the desired retardation across a particular cell gap. In particular it may be desirable for the device to have a small cell gap in order to minimize the amount of liquid crystal required. This would in turn imply a minimum birefringence for the LC mixture, in order to achieve the desired optical effects.

In general for LC mixtures, properties such as birefringence and clearing point are close to the weighted average of the individual components, whereas properties like UV resistance or chemical resistance may be limited by, or more strongly dependent on, the resistance of the least resistant component. Additionally, properties such as freezing point depend on the interactions of individual molecules, which become less favorable for crystallization as the molecules become more dissimilar from one another. Thus, when two LC components are mixed together, the resulting mixture may exhibit a freezing point significantly lower than either component by itself. Also, while the solubility of different LC components differs significantly depending on their molecular structure, the solubility may be improved when different components are present in the mixture, i.e., the solubility of two mixed components in a third component may be greater than the solubility of either component separately.

For example, although 7CB liquid crystal has a freezing point of approximately 30° C. and a clearing point of approximately 41° C., when mixed in equal proportions with 5CB liquid crystal, which has a freezing point of approximately 23° C. and clearing point of approximately 34° C., the LC mixture yielded has a clearing point of approximately 37° C. and a freezing point well below −70° C. However, this mixture may be no more UV-stable than either of its components, and the chemical susceptibilities of both components still exist in the mixture, as both molecules are capable of acting as organic solvents, especially at high temperature, and may thus attack certain organic substrate materials.

Mixtures of assorted LC components, which are combined to produce particular thermal, physical, chemical, and optical properties (including "eutectic" mixtures), are generally known. Perhaps the best known commercial LC mixture is E7, which is commonly used in video displays and is a mixture of 5 different LC components. The dominant component is 5CB (which has a low clearing point, good solubility, and small birefringence), but the mixture also contains significant quantities of 7CB, 8OCB, 5OCB, and 5CT (which has a high clearing point, poor solubility, and large birefringence). The mixture is designed to have a broad nematic range, a high clearing point, and a low freezing point, and the high solubility of the 5CB helps overcome the low solubility of the 5CT. The principles and design rules of LC mixtures such as these have been well described in the art.

In the prior art, dye molecules have sometimes been included in liquid crystals in electrochromic devices as described, for example, in "Dichroic Dyes for Liquid Crystal Displays" by Alexander V. Ivashchenko. Such systems are often called Guest-Host systems and the devices called dichroic devices. With proper selection of guest components (i.e., ODCs) and host components (i.e., electrotropic carrier materials), the dye molecules assume (approximately) the director of the liquid crystal molecule. Absorption and other related optical effects often occur along an angle "near" the director of the ODC molecule, and can have a slight difference (e.g., 5-10 degrees) between the director and maximum absorption angle. There are positive (pleochroic) and negative dichroic dyes which respectively absorb light along different axes of the molecule. Therefore, some embodiments disclosed herein may be understood as resembling an electrochromic Guest-Host system, except that the carrier material has been designed such that it is thermotropic (as described, for example, in U.S. patent application Ser. No. 12/172,156 to Powers et al. entitled "Thermally switched reflective optical shutter"), rather than electrotropic.

The orientation-dependent colorant (ODC) materials may also take a number of forms. For example, pleochroic dye systems generally have higher dichroic ratios and order parameters than negative dichroic dye systems. Embodiments may be constructed that utilize either positive or negative dichroic dyes, or a combination thereof, to affect different transmission properties across temperature ranges (e.g., shifting the color balance or hue). Performance of the dyes and system is affected by ultraviolet light (UV) stability, solubility, and order parameter of the dye(s) within the system. Performance of the system is also affected by liquid crystal host parameters, viscosity, order parameter, temperature range of physical states, stability, and birefringence. Note that Guest-Host systems for liquid crystals and dichroic dyes are often such that multiple dyes of one class are better at solvating, i.e., a mixture of similar dyes may have a greater total concentration than would be possible for any of the component dyes. Chemical "scaffolding" of dyes can also increase their solubility (e.g., attaching a liquid crystal molecule chemically to the dye molecule).

These various properties can be used to design a device with desirab\transmission properties. For example, if a particular dye has otherwise desirable properties (e.g., high UV stability) but low solubility in the desired Host, the thickness of the Guest-Host system can be increased to increase the attenuation of light transmitted. It should also be understood that many dyes that are unsuitable for electrochromic Guest-Host devices (e.g., cloth dyes) may be suitable for thermotropic devices because device operation is not contingent on electric fields.

Chiral (dopant) molecules may also be added to Guest-Host systems to change or improve the absorption or reflection of the guest(s). For example, a nematic liquid crystal system with multiple twists can be constructed using such molecules in order to affect contrast ratio or other optical properties. Optically active molecules can also be used as guests in Guest-Host systems, and can be used to construct systems that interact (e.g., reflectively) with circular polarizations of light.

Semiconducting materials may also be used as guests to provide infrared absorbing and reflecting Guest-Host systems.

Side-chain liquid crystals, polymer nematic liquid crystals, and nematic side-chain polymers, and other such Host systems may have slower electrochromic response times (or have no electrochromic response) when used in electrochromic Guest-Host devices, but they may be particularly suitable for thermotropic systems. Dye copolymers with liquid crystal may be employed to improve effective solubility. Crystalline polymer liquid crystal with embedded or copolymer dyes may be employed to provide a transition of order without a nematic or other such state. Such a device would not function electrochromically, but may be actuated by a thermotropic carrier. Doped polyacetylene copolymers and/or side-chains with liquid crystal are also alternative embodiments of systems disclosed herein.

The order (or order parameter) of the Host system generally varies with temperature (as described, for example, in "Liquid Crystals Second Edition" by S. Chandrasekar) and the order (or order parameter) of the Guest or ODC varies with it. In general, for classes of liquid crystal Host chemistries or mixtures, as the clearing point increases, so does the order parameter of a particular Guest. Also, in general, as the clearing point of the resulting system is approached, the order parameter drops. These variations in order (or order parameter) can be continuous or discrete, or both, depending on the system and temperature range. For example, in Guest-Host nematic liquid crystal systems, the order parameter of the host materials may be reduced by increases in temperature until the clearing point, where the liquid crystal then becomes isotropic, and then the order of both the Guest and Host may be effectively eliminated.

It should be understood that the director of the order in such systems can be determined using appropriate alignment materials and techniques. Further, the amount of order (order parameter) for a given Guest material (i.e., the included ODC material) is a function of the Host material chosen as well as the temperature, and that through skillful materials selection and system design, it is possible to achieve many different relationships of temperature vs. order. One desirable property in a temperature relation is to have the order parameter of the Guest vary monotonically with temperature over the temperature design range of the device. Another desirable property is to incorporate hysteresis into the temperature relation. For example, in a nematic, thermotropic liquid crystal Guest-Host device utilizing the transition from nematic to isotropic states, it may be desirable for aesthetic reasons to have the "transition" temperature be several degrees higher when the device is transitioning from nematic to isotropic than when transitioning from isotropic to nematic, as this will reduce the probability that the device will rapidly change transmission characteristics back and forth when near the transition temperature.

Polyacetylene is one polymer which can be modified chemically to become highly electrically conductive. This and other highly conductive polymers can strongly interact with light reflectively, as in a wire-grid polarizer, and the interaction can be dependent on the orientation of the molecule. Conductive polymers can also interact with light absorptively, with the interaction dependent on the orientation of the molecule as well. Both polymers and dye molecules can be integrated into polymer stabilized twisted nematic (PSTN) structures, as well as other polymer/liquid crystal systems. By choosing the order parameter of the doped polyacetylene properly, it will be possible to select the ratio of forward to backward scattering of devices using conductive polyacetylene, as well as made with other similar ODC Guests. Polyacetylene molecules can also have chemical "scaffolding" molecules attached to them to increase their solubility.

Polyacetylene polymer can be manufactured into a reflective polarizer by using it as the Guest with polymer liquid crystal as the Host, and then cooling the system until the polymers are fixed in place. Polyacetylene can also be manufactured into reflective polarizers in processes like those used to manufacture PVA-iodine polarizers.

The human eye responds to the relative amounts of several ranges of visible light. Thus many different spectral distributions may appear identical to the human eye. Metamerism is the matching of apparent color of objects with different spectral power distributions, and colors that match this way are called metamers. The absorption, transmission, fluorescence, and reflection of light by molecules (such as dye molecules) has a spectral (frequency) component to it. By properly selecting components (e.g., combinations of dyes), it is possible to select the perceived hue of transmission or reflection, or to select the specific spectrum, or amount of energy, that is transmitted or reflected, including UV, visible, or IR light.

Numerous other combinations of thermotropic carrier ("host") and orientation-dependent colorant ("guest") materials are possible beyond those discussed or enumerated here and may be employed without departing from the spirit of this embodiment.

Figure 2:
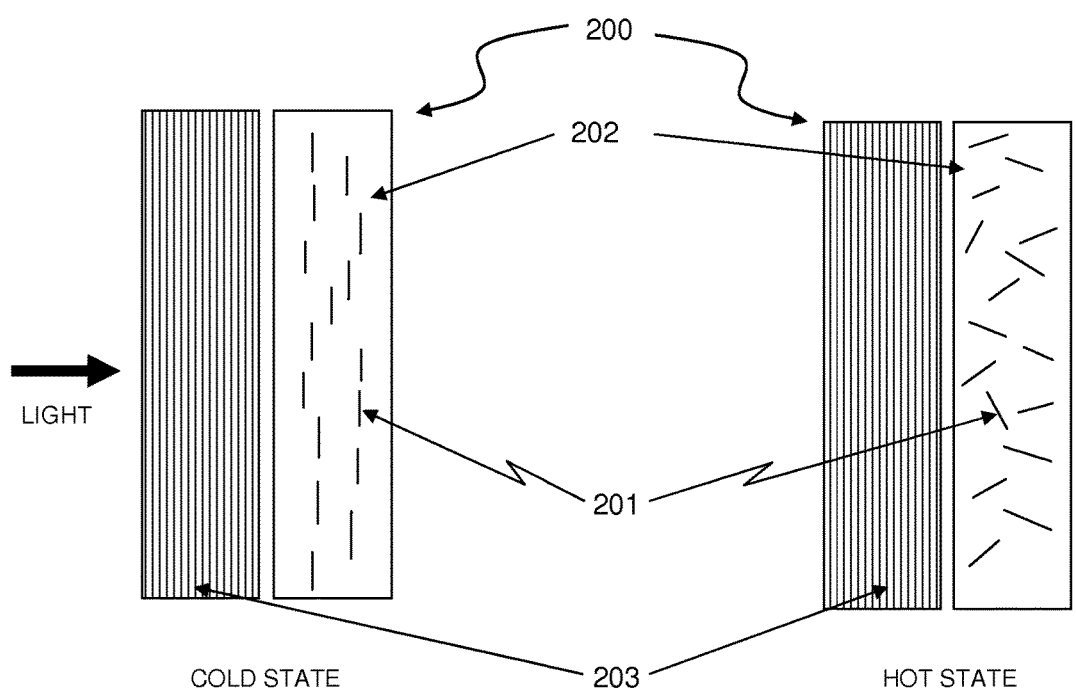
FIG. 2 is a schematic view of an exemplary implementation of a thermochromic filter used in combination with a polarizer. The thermochromic filter has ODC materials suspended or dissolved in a thermotropic carrier material (e.g., a thermotropic liquid crystal having molecules are aligned parallel to the substrate) that provides or induces order for the ODC materials at a lower temperature and does not at a higher temperature.

FIG. 2 is a schematic, cross-section view of another exemplary embodiment of a thermochromic filter device 200. As in the prior embodiment of FIG. 1, included ODC materials 201 are inside an order-providing thermotropic carrier material 202. A polarizing film 203 is placed between the incident light and the thermotropic carrier material 202 containing the included ODC materials 201. However, assuming that the ODC molecules interact more strongly with light along their long axis, the order provided is now such that the included materials 201 interact preferentially with one polarization of light. The polarizer 203 also interacts with this same polarization of light. Thus, in the lower temperature state, if together the "thermotropic polarizer" created by the ordered state of the included materials 201 and the polarizer 203 efficiently polarize the light, then approximately 50% of the light is transmitted by the device. In the higher temperature state, the "thermotropic polarizer" created by the ordered state of the included materials 201 no longer exists. The polarizer 203 still interacts with one polarization of light, but now the included materials interact with both polarizations of light, reducing the amount of light transmitted to below 50%.

This arrangement may be advantageous for increasing the contrast ratio of a Guest-Host system, or for producing other desirable optical effects (e.g., particular combinations of absorption and reflection at particular wavelengths) that would be difficult to achieve with the guest (ODC) and host (carrier) materials alone. The exact arrangement of the layer may deviate from the depiction in FIG. 2 without significantly affecting the functioning of the device. Optically speaking, it is of little consequence whether photons pass through the polarizer and then the guest-host system, or vice-versa. Various types of polarizers can be used, including absorptive, reflective, diffusive, and diffractive polarizers. In addition, more than one polarizer may be employed, and various optional components such as substrates, adhesives, sealants, solubility promoters, bandblock filters, longpass filters, shortpass filters, and fixed tints may be added in any combination without departing from the spirit of this embodiment.

However, it should be noted that if a retarder, waveblock, or birefringence compensation film or layer is employed, then the ordering of the layers does matter. For example, the polarization axis of a linear polarizing film is typically parallel to the draw direction of the film. However, if light passes through the polarizer and then a waveblock layer, the resulting polarized light can be "rotated" such that its polarization axis occurs at 45 degrees (or some other desirable angle) to the draw direction. This may be useful in that in some cases a 45-degree polarization axis allows for a simpler manufacturing process, as described in U.S. patent application Ser. No. 12/545,051 by Powers et. al. Alternatively, compensating to some angle slightly larger or smaller than 45 degrees may help to "open up" the light transmission of the filter by effectively misaligning the polarizers, such that the contrast ratio of the device is reduced and the blocking-state light transmission is increased, as described for example in U.S. Patent Application #2009/0015902 to Powers et. al.

It may be desirable in some circumstances to place waveblocks on both polarizers in a two-polarizer device, or on all polarizers in a multiple-polarizer device. It may also be desirable in other circumstances to place such optical films on only one polarizer. For example, two polarizers "rotated" by 45 degrees each may be comparable to one polarizer "rotated" by 90 degrees and one polarizer not rotated at all. Reducing the number of waveblocks may reduce the cost of the final product while retaining the same functionality. Therefore, it may be recognized that waveblocks, retarders, birefringence compensation films, birefringent materials of particular thickness, or other related polarity-rotating materials or devices may be combined in a large variety of ways in various implementations of this technology.

The amount of polarity rotation provided by a retarder/waveblock or birefringence compensation film or coating is proportional to both the birefringence and the thickness of the waveblock material. Thus, it is straightforward to devise a film or coating to achieve very precise amounts of polarity rotation, and the methods for doing so require no further elaboration here, except to note that achromatic waveplates will generally introduce fewer color anomalies than non-achromatic waveplates. The implementation also encompasses versions where a standard polarizer and thermotropic polarizer have perpendicular or otherwise non-parallel polarization axes, negative dichroics with parallel alignment, with and without an ordinary (non-thermotropic) polarizer, and versions wherein the device becomes more reflective, absorptive, or fluorescent when hot.

Figure 3:
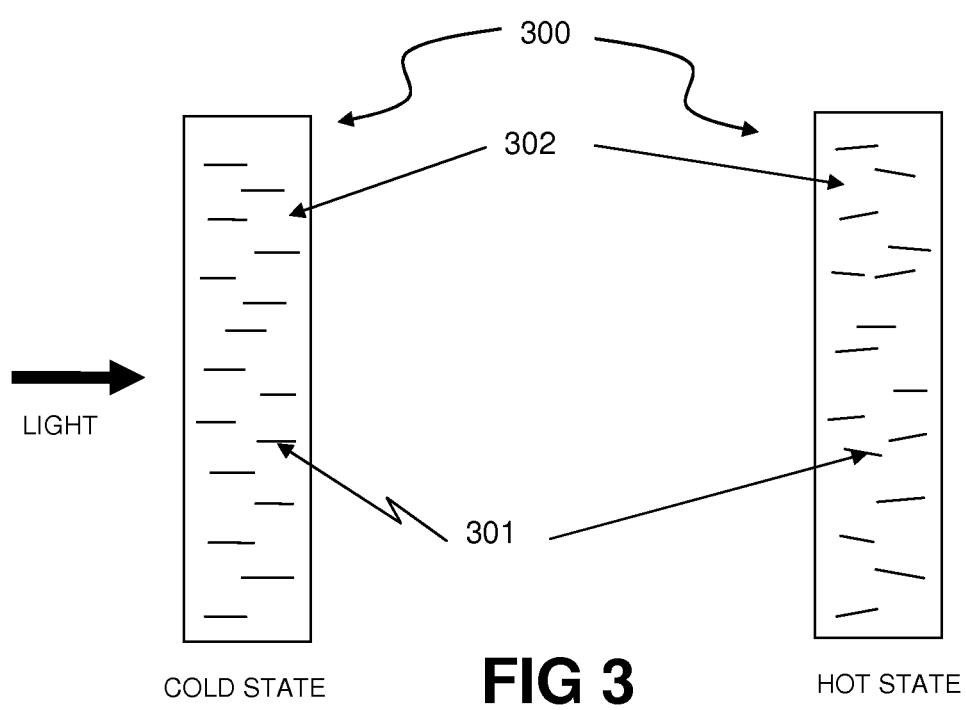
FIG. 3 is a schematic view of another exemplary implementation of a thermochromic filter having ODC materials suspended or dissolved in a thermotropic carrier material e.g., a vertically-aligned thermotropic liquid crystal) that provides or induces more order in the ODC materials at a lower temperature than it provides at a higher temperature.

FIG. 3. is a schematic, cross-section view of another exemplary embodiment of a thermochromic filter device 300. As in the prior embodiments of FIGS. 1 and 2, included ODC materials 301 are inside an order-providing, thermotropic carrier material 302. At a lower temperature, a given percentage of the incoming light passes through the order-providing material 302 as well as the included materials 301 due to their ordered orientation with respect to the incoming light. At a higher temperature, the order of the included materials is reduced (but the order parameter is not zero), so that more of the incoming light is absorbed or reflected due to the unordered orientation of the included materials. Thus for this device, the reduction in transmitted light may be more gradual than for the embodiment of FIG. 1. Note that this device may polarize light coming from directions other than the one indicated in the figure at both the lower and higher temperatures, as the included ODC materials are in ordered orientations at both temperatures, and thus may be considered a "thermotropic polarizer" for some purposes.

It should be understood that the structure and orientations depicted in FIG. 3 may exist as either the only possible states of the device, or as intermediate states. For example, a particular arrangement of ODC materials and thermotropic carrier materials may produce the orientations of FIG. 1 at extreme temperatures and the orientations of FIG. 3 at more modest temperatures, without departing from the spirit of either embodiment or of this disclosure as a whole.

Figure 4:
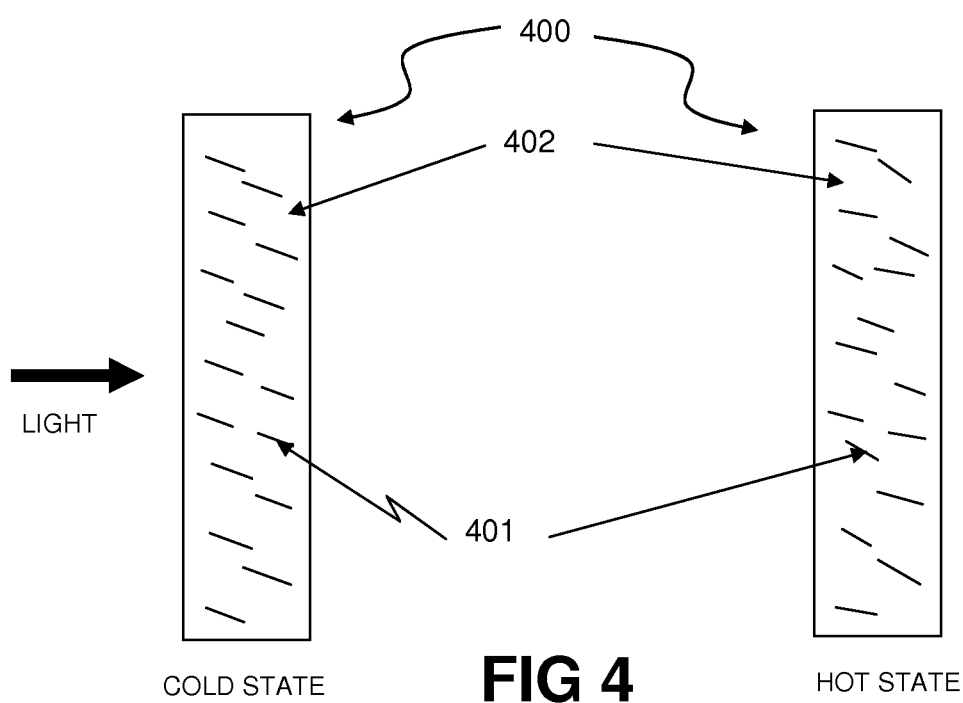
FIG. 4 is a schematic view of a further exemplary implementation of a thermochromic filter having ODC materials suspended or dissolved in a thermotropic carrier material (e.g., a vertically aligned thermotropic liquid crystal) where the directional polarizing properties of one or more thermotropic polarizer layers are used to vary the transmission properties (including polarizing effects) of the filter based on the direction of the light being transmitted.

FIG. 4. is a schematic, cross-section view of an additional exemplary embodiment of a thermochromic filter device 400. As in the prior embodiments of FIGS. 1, 2, and 3, included ODC materials 401 are inside an order-providing, thermotropic carrier material 402. However, at a lower temperature, a given percentage of the incoming light passes through the order-providing material 402 as well as the included ODC materials 401 due to their ordered orientation with respect to the incoming light. Further, at a higher temperature, the order of the included ODC materials 401 is reduced (but the order parameter is not zero), so that more of the incoming light is absorbed or reflected due to the unordered orientation of the included ODC materials 401. Thus for this thermochromic filter device 400, the reduction in transmitted light may be more gradual than for the embodiment of FIG. 1. Again, this thermochromatic filter device 400 polarizes light coming from directions other than the one indicated in FIG. 4 at both the lower and higher temperatures. However, the director of the included ODC materials 401 (determined by the system) is chosen in accordance with desirable interactions of the thermochromatic filter device 400 with light that varies in incoming direction (e.g., such as with solar energy, which varies in incoming direction both due to rotation of the planet as well as due to season).

The structure and orientations depicted in FIG. 4 may exist as either the only possible states of the device, or as intermediate states. For example, a particular arrangement of ODC materials and thermotropic carrier materials may produce the orientations of FIG. 1 at extreme temperatures and the orientations of FIG. 4 at more modest temperatures, without departing from the spirit of either embodiment or of the present disclosure as a whole.

The included ODC materials may be any number of materials including dyes, rods, particles, or polymers in a thermotropic (e.g., nematic) liquid crystal carrier material. Properly selected ODC guest materials will assume the order and director of the liquid crystal while the liquid crystal is in the nematic state (or other liquid crystalline states such as smectic), and somewhat or completely lose their order while the liquid crystal is in the isotropic state. Then if the liquid crystal is in a liquid crystalline state (e.g., nematic) and aligned vertically between two transparent parallel surfaces, light traveling through the device perpendicular to the surfaces will not significantly interact with the included ODC material (e.g., positive dichroic dyes). However, as the temperature increases (i.e., above the isotropic temperature), the thermotropic liquid crystal will not have an aligned order. Thus, the liquid crystal will be more randomly oriented and will not impart order to the included materials, which will also be randomly oriented and thus interact significantly more with light traveling through the device perpendicular to the surfaces. Note again here, the guest material need not be a liquid crystal.

In a further implementation of this embodiment, the included ODC material may be an electrically conductive polymer. This selection is not made for electrical reasons per se, but for the desirable optical properties (absorption and reflection) that are typical of electrically conductive materials. Thus, the interactions with light may be selected to be either reflective or absorptive, or any combination thereof. In the randomly oriented state, the reflections may not be specular, but rather diffusively reflective, which is desirable in many applications.

In some implementations of this embodiment, the included ODC materials may be inside a thermotropic carrier material (e.g., thermotropic liquid crystal), which provides a director parallel to the surfaces (i.e., is aligned in parallel) and thus light traveling through the device perpendicular to the surfaces will interact with the included ODC material (e.g., positive dichroic dyes) as a polarizer. One or more polarizers that are part of the device may be oriented such that they do not interact with the light that is transmitted through the polarizer formed by the included materials. However, as the temperature increases (i.e., rises above isotropic temperature), the material (e.g., a thermotropic liquid crystal) will not have an aligned order, but will be more randomly oriented, and thus will not impart order to the included materials. Thus, the included materials will also be randomly oriented and interact significantly more with light of the polarization transmitted by the polarizer(s), if any, and change how much light is transmitted.

In other implementations, the included ODC materials interact with light such that when their director is perpendicular to the surfaces, the included materials interact with the light (e.g., absorb, reflect, or fluoresce the light) more strongly than when their director is parallel to the surfaces (i.e., negative dichroics).

While several exemplary embodiments are depicted and described herein, it should be understood that the present invention is not limited to these particular configurations. For example, the polarizers (if any) employed in the structure may be linear or circular, absorptive or reflective, diffusive or specular, and/or fixed or thermotropic in nature. One or more polarizers used in the device may be spectrally selective or may be selected to have a high or low polarizing efficiency. The order-providing materials can be thermotropic liquid crystals, ice/water, phase change materials, crystalline structures, or any of many forms of matter which can provide order to the included ODC materials. The polarizers, including thermotropic polarizers, may be in any relation to each other. The devices may be configured to become more transmissive with increases in temperature. Negative and positive dichroic ODCs may also be combined.

In addition, it should be understood that in some cases the order and director may be provided by the ODC material itself (e.g., crystalline materials), such that the "guest" and "host" functions are combined in a single, carefully selected or constructed material. For example, molecular chains of polyacetylene can act as electrical "wires" and may be an excellent candidate ODC "guest" material. However, polyacetylene chains also exhibit liquid crystal properties, and thus may be considered a "host" candidate as well, or a component of the host.

Alternatively or in addition, the included ODC "guest" materials and or the thermotropic carrier or "host" materials may be attached to or constrained by a polymer or polymer network that is part of the substrate material, or may be attached to one or more of the substrate's surfaces.

In another variant of the above embodiments, the order of the host material, and thus of the included ODC material, may also be changed by an electrical "override". An electrical "override" may be present for the order-providing material, for example by changing the order and director of a nematic liquid crystal through the use of torquing electrical fields. Alternatively, the guest material may be the locus of the electrical "override" (e.g., as in a suspended particle device). This may be particularly effective in cases where the ODC "guest" or thermotropic "host" consist of, or include, an electrically conductive polymer as described above.

The included materials may be selected to provide desired transmission, reflection, fluorescence, and absorption characteristics, spectrums, hues, or aesthetics, or to provide desirable energy transmission, absorption, and reflection characteristics. In addition, multiple thermochromic devices, of either the same type or of different types, may be combined to produce different aesthetic, optical, thermal, privacy, visual contrast, or solar heat gain properties. The amount of order may locally or globally increase with temperature rather than decrease, or the device may be constructed such that the transmission of light increases with increasing temperature. The guest mixture may be monochrome or black, tinted, fluorescent, and/or metameric.

In another possible implementation, the device may additionally be a thermotropic polymer dispersed liquid crystal device. For this purpose, the Guest-Host system may be selected for low solubility in the polymer, or a low birefringence Host (e.g. liquid crystal) may be matched with the optical index of the polymer to improve device performance and optical clarity.

It should also be understood that any or all of the embodiments and variants described above may be paired with a number of optional components without altering their essential nature or function. These may include, but are not limited to, substrates, fixed tints, adhesives, sealants, wave plates, reflectors, partial reflectors, transreflectors, low-emissivity materials, UV-absorptive or reflective materials, and/or IR absorptive or reflective materials.

Additionally, there may be materials that provide more order at higher temperatures, or different amounts of order at different temperatures, such as the change in order and director with changes in temperatures that occurs in thermotropic liquid crystals that have both nematic and smetic states. Devices thus may be based on changes in the director or order with temperature rather than simply upon a loss of order with changes in temperature. Additionally, the included ODC material may in fact be simply in proximity to the order providing carrier material rather than wholly dissolved or suspended within it, or may induce changes in the amount of order the order-providing material provides at various temperatures.

Optional components such as coatings, films, spacers, fillers, or support structures may be added to suit the needs of a particular application or a particular manufacturing method, and degraded forms of some embodiments can be produced by deleting or substituting certain components. The exact arrangement of the various layers can be different than is depicted here and, depending on the materials and wavelengths selected, different layers can be combined as single layers, objects, devices, or materials, without altering the essential structure and function of the invention.

Although the description above contains many specificities, and reference to one or more individual embodiments, these should not be construed as limiting the scope of the invention but rather construed as merely providing illustrations of certain exemplary embodiments of this invention. There are various possibilities for implementation of different materials and in different configurations and those skilled in the art could make numerous alterations to the disclosed embodiments without departing from the spirit or scope of this invention.

In addition, although various embodiments of this invention have been described above with a certain degree of particularity, all directional references e.g., inside, proximal, distal, upper, lower, inner, outer, upward, downward, left, right, lateral, front, back, top, bottom, above, below, vertical, horizontal, clockwise, counterclockwise, left circular, and right circular are only used for identification purposes to aid the reader's understanding of the present invention, and do not create limitations, particularly as to the position, orientation, or use of the invention. Connection references, e.g., attached, coupled, connected, and joined are to be construed broadly and may include intermediate members between a collection of elements and relative movement between elements unless otherwise indicated. As such, connection references do not necessarily imply that two elements are directly connected and in fixed relation to each other. Specific values cited in this text, such as transition temperatures, clearing points, percentages of reflection, transmission or absorption are illustrative and shall not be limiting. More generally, it is intended that all matter contained in the above description or shown in the accompanying drawings shall be interpreted as illustrative only and not limiting. Changes in detail or structure may be made without departing from the basic elements of the invention as defined in the following claims.

What is claimed is:

1. A window comprising a thermochromic filter device incorporated into a structure of the window and further comprising
   an order-providing, thermotropic carrier material defining a director orientation; and
   an orientation-dependent colorant material included within the thermotropic carrier material responsive in order to the director orientation; wherein
   the director orientation of the thermotropic carrier material is responsive to temperature-induced changes in the thermotropic carrier material;
   the orientation-dependent colorant material changes orientation with the director orientation, whereby light transmission properties of the window vary with temperature as a result.

2. A thermochromic filter device comprising
   an order-providing, thermotropic liquid crystal carrier host material defining a director orientation;
   an orientation-dependent, negative-dichroic colorant guest material included in the thermotropic liquid crystal carrier host material; and
   a pair of alignment structures positioned on opposing sides of a layer of the thermotropic liquid crystal carrier host material wherein
   the director orientation of the thermotropic carrier material is responsive to temperature-induced changes in the thermotropic carrier material, and opposing inner surfaces of the alignment structures are configured to provide a parallel alignment for the thermotropic liquid crystal carrier host material when in a nematic state; and
   the colorant guest material changes orientation with the director orientation to produce a higher light transmission in the nematic state and a lower light transmission in an isotropic state for a wavelength range.

3. The device of claim 2, wherein a single colorant guest material produces the higher and lower light transmission for a monchromatic wavelength range.

4. The device of claim 2, wherein
   the colorant guest material comprises multiple colorant guest materials; and
   the wavelength range further comprises an extended range of wavelengths or multiple ranges of wavelengths,
   whereby the device appears as tinted, hued, black, or metameric.

5. The device of claim 2, wherein the wavelength range includes visible wavelengths.

6. The device of claim 2, wherein the wavelength range includes near-infrared wavelengths emitted by the sun.

7. The device of claim 2, wherein the wavelength range includes visible wavelengths.

8. The device of claim 2, wherein the wavelength range includes near-infrared wavelengths emitted by the sun.

9. The device of claim 8, further comprising
   a first circular polarizer positioned on an outer surface of one of the alignment structures; and
   a second circular polarizer of opposite handedness to the first circular polarizer positioned on an outer surface of the first circular polarizer; wherein
   the first and second circular polarizers function to filter a second wavelength range.

10. The device of claim 2, wherein the thermotropic liquid crystal carrier host material and the orientation-dependent, negative-dichroic colorant guest material function as a switchable polarizer.

11. The device of claim 10, further comprising a spectrally selective linear polarizer positioned on an external surface of one of the alignment structures, which functions to select a range of wavelengths for transmission to the thermotropic liquid crystal carrier host material and the orientation-dependent, negative-dichroic colorant guest material.

12. The device of claim 9, wherein the second wavelength range is the same as the wavelength range filtered by the colorant guest material.

13. The device of claim 9, wherein the second wavelength range is different from the wavelength range filtered by the colorant guest material.

14. The window of claim 1, wherein
    the thermotropic carrier material has a clearing point temperature that defines a transition between an ordered state and a disordered state of the thermotropic carrier material;
    the thermotropic carrier material is in the ordered state when a temperature of the thermotropic carrier material is below the clearing point temperature and the thermotropic carrier material is in the disordered state when the temperature of the thermotropic carrier material is above the clearing point temperature; and
    a greater amount of light is transmitted through the window when the thermotropic carrier material is in the ordered state than when the thermotropic carrier material is in the disordered state.

15. The device of claim 2, wherein
    the thermotropic liquid crystal carrier material has a clearing point temperature that defines a transition between an ordered state and a disordered state; and
    the thermotropic liquid crystal carrier material is in the nematic state when a temperature of the thermotropic liquid crystal carrier material is below the clearing point temperature, and the thermotropic liquid crystal carrier material is in an isotropic state when the temperature of the thermotropic liquid crystal carrier material is above the clearing point temperature.

* * * * *